United States Patent [19] [11] 4,270,319
Spasojevic [45] Jun. 2, 1981

[54] MOBILE VENDING BOOTH

[76] Inventor: Ratko Spasojevic, Sandbergerstrasse 36, D-7000 Stuttgart 1, Fed. Rep. of Germany

[21] Appl. No.: 87,045

[22] Filed: Oct. 22, 1978

[30] Foreign Application Priority Data

Oct. 24, 1978 [DE] Fed. Rep. of Germany ....... 2846272

[51] Int. Cl.³ .......................... E04B 7/16; E04B 3/43; B60P 3/025
[52] U.S. Cl. ......................................... 52/36; 52/67; 52/69; 52/71; 52/143; 296/22; 296/24 A; 312/297
[58] Field of Search .................... 296/22, 24 A; 52/36, 52/64, 71, 69, 67, 143; 312/239, 297, 5

[56] References Cited

U.S. PATENT DOCUMENTS

| 651,554 | 6/1900 | Norcross | 312/297 X |
|---|---|---|---|
| 1,760,186 | 5/1930 | Barker | 52/36 |
| 1,997,952 | 4/1935 | Snelling | 52/36 X |
| 2,513,042 | 6/1950 | Muhn | 52/64 X |
| 2,886,856 | 5/1959 | Suk Kun Che | 52/69 |
| 3,129,752 | 4/1964 | Whiting | 160/363 |
| 3,662,410 | 5/1972 | Lankheet | 52/67 X |
| 3,723,824 | 3/1973 | Cuorato et al. | 52/67 |
| 3,741,606 | 6/1973 | Grier | 296/24 A |
| 3,815,949 | 6/1974 | Ulert | 52/67 X |
| 4,133,148 | 1/1979 | Swenumson | 52/64 |

FOREIGN PATENT DOCUMENTS 1014110 5/1952 France ....................................... 296/22

Primary Examiner—Alfred C. Perham
Attorney, Agent, or Firm—McCormick, Paulding & Huber

[57] ABSTRACT

A mobile vending booth of the sort having a vending opening on at least one long-side and having a chassis floor, is equipped with at least one roller shutter for shutting off at least the vending opening. Furthermore, there is a roller shutter guideframe able to be pushed slippingly into the booth and for making it broader for an operation condition, the guideframe running along the full length of the long-side of the booth and being able to be pulled out.

23 Claims, 14 Drawing Figures

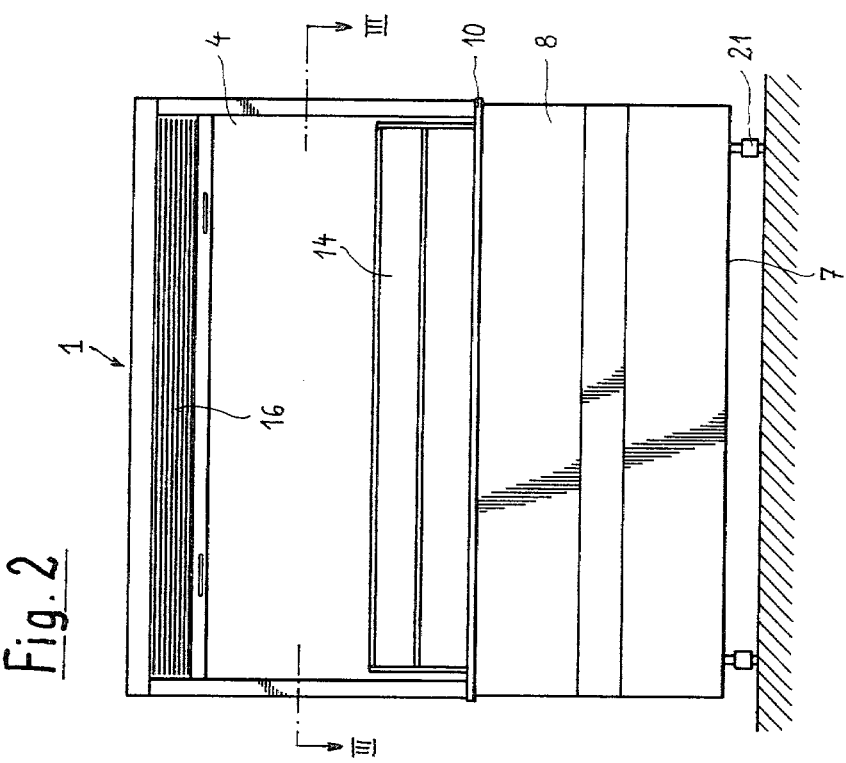
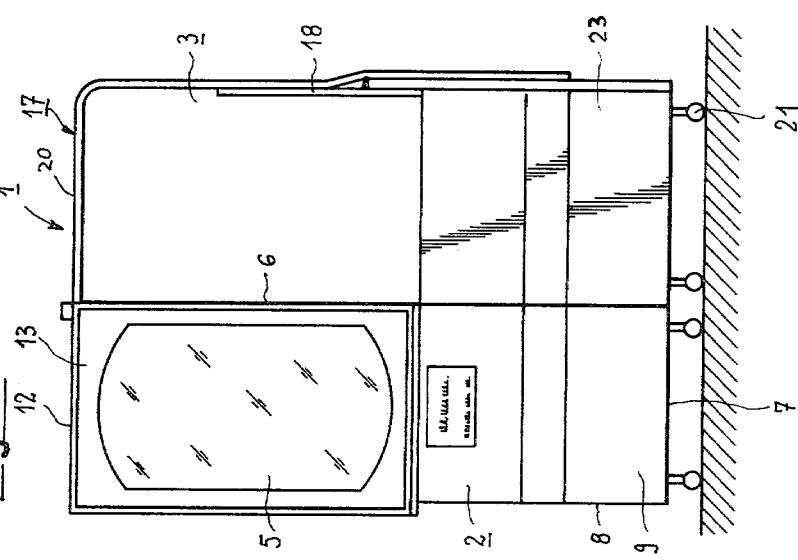

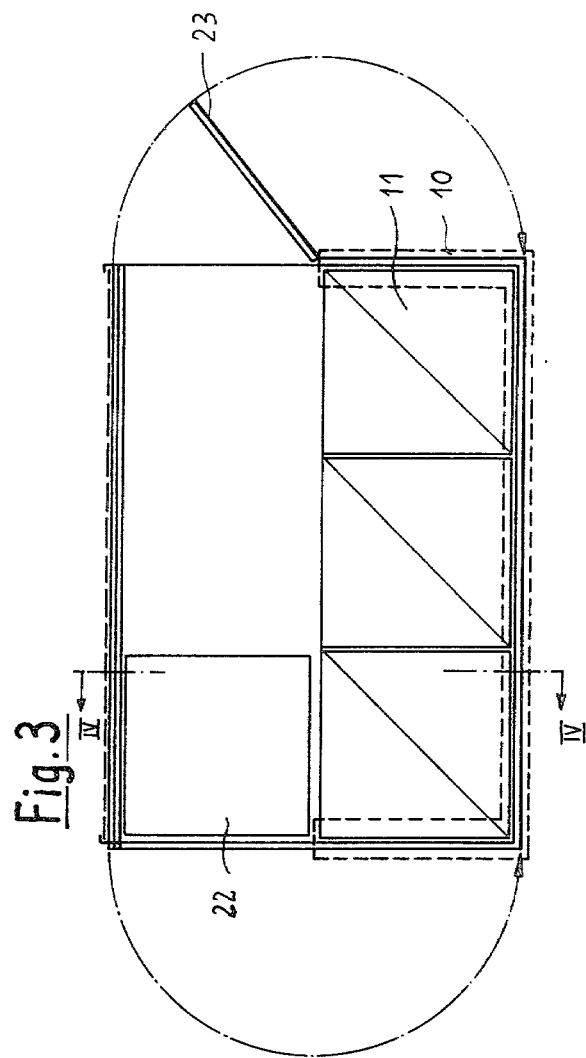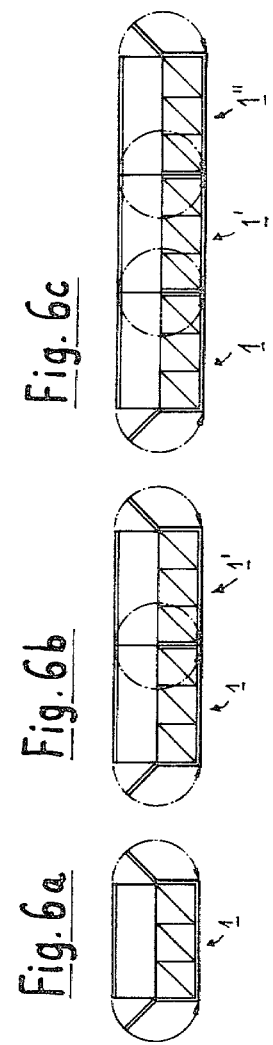

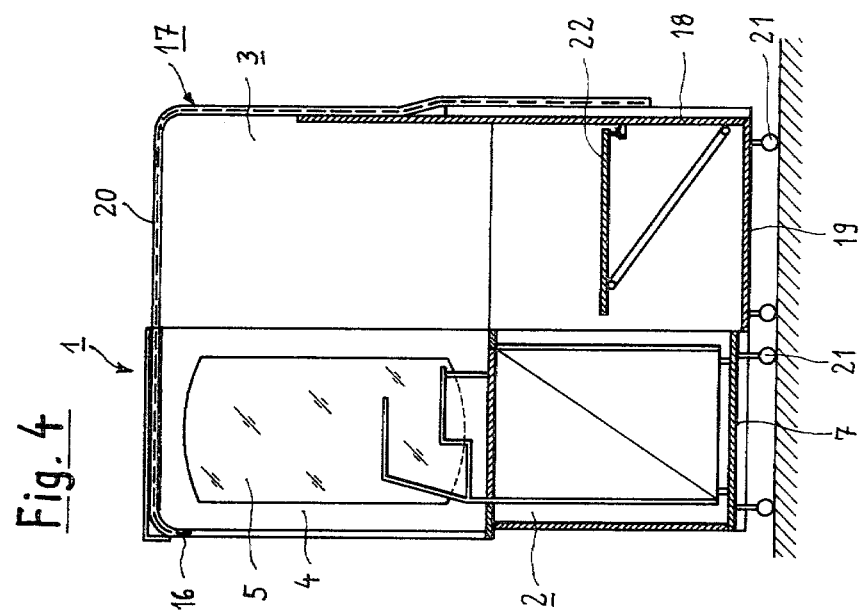
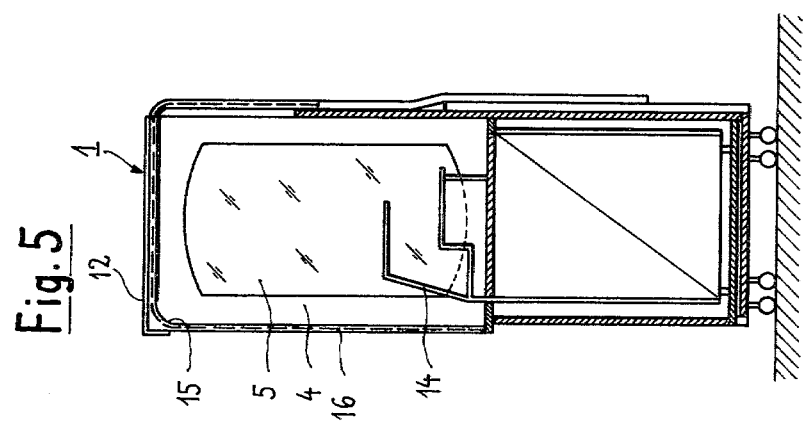

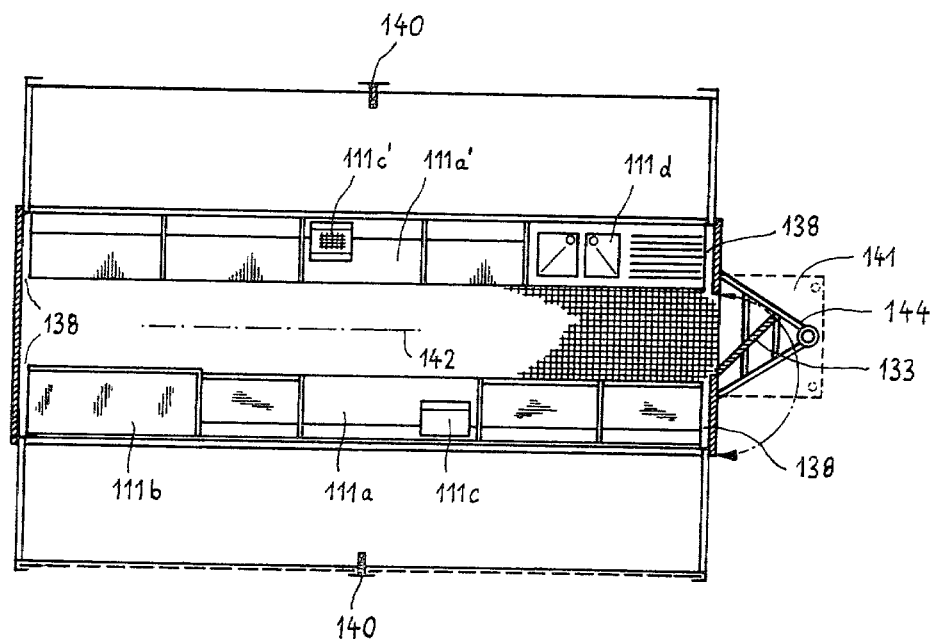

4,270,319

MOBILE VENDING BOOTH

BACKGROUND OF THE INVENTION (1) Field of the Invention

The invention is with respect to a mobile vending booth with a vending opening at at least one long-side and with a chassis floor.

(2) Past designs

In a design for a vending booth of this sort, the vending openings were designed for being shut up by a number of shutter doors able to be folded upwards into a position in which they were used as a roof. In this respect a complex system was needed for effecting the upward folding and downward folding of the doors. Furthermore, in the folded up position such doors only keep rain and strong sunlight from persons using the vending booth and are, however, of no use for keeping such persons dry when there is rain and strong winds.

In a further suggestion for such a vending booth in addition to the upwardly folding shutter doors, side floors, able to be folded downwards, were present, without, however, the system having anything for keeping persons dry when rain is falling. Although in this earlier suggestion the vending of goods from all sides of the booth was possible, it took up much space so that, clearly, its use would not be possible where space is limited.

Short Outline of the Invention

One object of the invention is that of making such a better construction of mobile vending booths, that is to say vending booths able to be moved from place to place, that they may readily be used even where space is limited and may be readily transported. Furthermore, shutting up the unit for transport and opening again for vending purposes is to be simpler.

For achieving these and other objects the mobile vending booth of the invention has at least one roller shutter for shutting at least the vending opening and has at least one roller shutter guideframe, which is slidingly supported within the vending booth and is able to be pulled out for making the vending booth broader, as necessary for vending, along one full long-side of the vending booth.

In my invention the vending booth does not make use of shutter doors needing much space but of a roller shutter which may be much more simply worked. When it is not being used and for transport the vending booth may be made very much narrower by pushing in the guideframe so that it may even be pushed through narrow spaces in department stores and when not being used at all takes up little space.

Useful developments of the invention are to be seen from the dependent claims.

In one form of the invention, the length of the vending booth may be changed as may be desired to be in line with operation conditions by simply joining together vending booths of the same sort in a line in the necessary number.

In another form of the invention, vending from the booth may furthermore take place from the long-side, at which the guideframe has been pulled out. The roller shutter is, in this respect, used at the same time as a roof over a folding down side floor. On pushing the guideframe in again, the roller shutter is rolled up into roller shutter boxes.

In the form of the invention as claimed in claim 14, it is, for example, possible for only one half of the vending booth to be opened while the other half is shut off by the pulled down roller shutter, so that they shut off, all-weather inner space is produced in front of the vending opening.

In still another form of the invention, behind each vending opening there are counter structures making it possible for the vending booth to be used with the least possible number of workers, as a snack vending booth in which food and drinks may be prepared.

In another form of the invention, the guideframe has windows on the two ends (or, in place of the windows, it would be possible to have folding doors) so that persons who are in front of the vending booth, are not troubled by even the worst weather conditions. In another form of the invention, the side door does not have to be folded upwards on stopping use of the vending booth and it is enough for the roller shutter to be pulled down as far as it will go for shutting the booth. In this respect operation of the booth is very much simpler than past constructions of such booths.

In yet another form of the invention, the vending booth is so constructed that the vending of goods is readily possible on the two long-sides of the booth.

LIST OF FIGURES

A number of preferred embodiments of the mobile vending booth, that is to say a vending booth able to be moved from place to place, having the teachings of my invention, will now be made clear in detail using the figures.

FIG. 1 is a side view of a first form of the mobile vending booth in the working condition.

FIG. 2 is a view of the vending booth of FIG. 1 from the front.

FIG. 3 is a sectional view on the line III—III through the booth of FIG. 2.

FIG. 4 is a sectional view through the vending booth on the line IV—IV of FIG. 3.

FIG. 5 is a sectional view, on the same lines as in FIG. 4, running through the vending booth in the shut-off condition.

FIGS. 6a to 6c make clear different ways of putting together vending booths.

Figure 8:
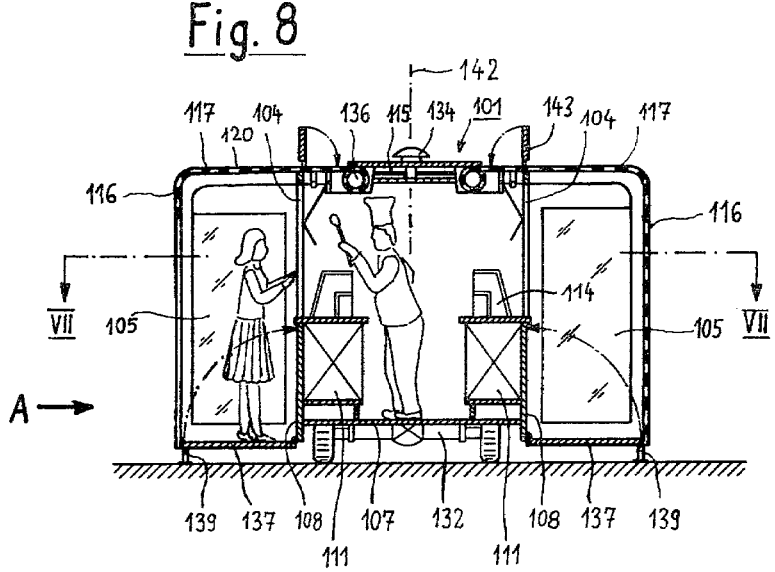

FIG. 7 is a sectional view through a further form of the vending booth of my invention on the line VII—VII of FIG. 8.

FIG. 8 is a cross-sectional view of the vending booth of FIG. 7.

Figure 9:
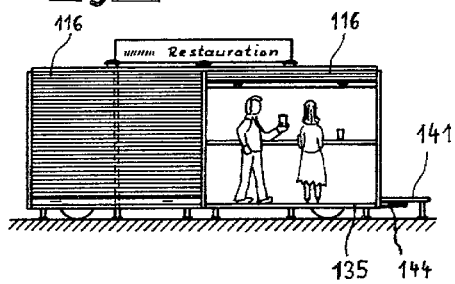

FIG. 9 is a view of the vending booth looking in the direction of arrow A in FIG. 8.

Figure 10:
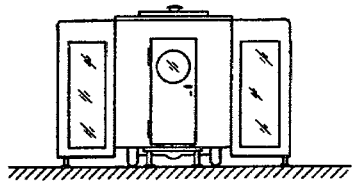
Figure 11:
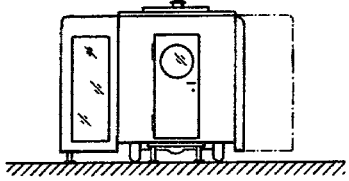
Figure 12:
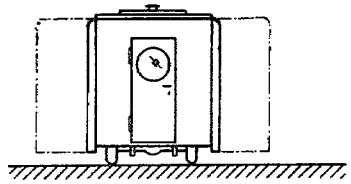

FIGS. 10 to 12 are views of a further form of the vending booth, that is to say opened on both sides, opened on one side and shut on the two sides.

DETAILED DESCRIPTION OF PREFERRED EMBODIMENTS OF THE INVENTION

FIGS. 1 to 6 are views of a first mobile vending booth, that is to say a vending booth able to be moved from place to place, generally numbered 1. The vending booth 1 is made up of two housing parts 2 and 3, which are able to be pushed telescopingly the one into the other and which in FIGS. 1 and 4 are to be seen in the pulled-out condition (operation or working condition), while in FIG. 5 they are to be seen in the pushed-in conditon (that is to say the overnight or transport condition).

The housing part 1 has the form of a box-like housing which is rectangular in a horizontal sectional view and which at the front side has a vending opening 4 and at its two ends has windows 5 of brown-shaded safety glass, while at its back 6 it is open. The housing part 2 has a strongly made chassis floor 7, a front board 8 and side walls 9, which are made of all-weather plastics-coated chip boarding stretching upwards towards the vending opening as far as a rest 10 of the same material. The housing part 2 has in this part of it counter structures 11, such as freezing, heating and/or grilling units. In place of this, however, it may furthermore have shelvings for ready-packed meals which are to be vended.

The part of the housing part 2 above the rest 10 is made of a strong metal frame, which is placed running round it on all sides and has supports (or mounts) 13 for window material 5. The supports 13 are, as well, in the form of all-weather, plastics-coated chip boarding with the necessary cutouts for the window material or glass. Over the rest 10 and the counter structures 11 there is, lastly, glass vending cupboard 14 as is normally used in such vending booths.

At the inner ends of the vending booth 1, there are U-rails 15, stretching over the full height of the vending booth and over the full depth of the housing part 2, for guiding a roller shutter 16. Rails 15 are fixed in position. The operation condition of the vending booth is to be seen in FIG. 4, in which the roller shutter 16 is pushed up while in FIG. 5, in the shut condition of the booth, the roller shutter 16 is pulled down.

The other housing part 3 is generally made up of a guideframe 17 for the roller shutter 16, a back wall 18 fixedly joined to it and made of all-weather plastics-coated chip boarding and a floor 19 completing the guideframe 17, which, at the ends of the vending booth, has U-rails 20, which near the roof part of the vending booth may be pushed horizontally telescopingly into the U-rails 15 and are designed stretching downwards from the roof at the back side of the vending booth to such a level that, when the vending booth is opened, the roller shutter 16 may be pushed so far upwards that the vending opening 4 is completely cleared (see FIG. 4). When the vending booth is shut up (FIG. 5), the roller shutter 16 shuts not only the vending opening 4, but furthermore the part over the back wall 18.

The floor 19 is placed at a level somewhat lower than the chassis floor 7, so that on shutting up the vending booth it is moved under the chassis floor 7 and, lastly, goes into the position of FIG. 5. In this position the vending booth is shut on all sides and is only in need of a small amount of space and, furthermore, it may be transported in this condition readily through narrow openings, for example in buildings used for sporting purposes and department stores.

Not only the chassis floor 7, but furthermore the floor 19 of the housing part 3 have at the lower side four ball-bearinged rollers 21 with rubber tires ("ball rollers"). For this reason the vending booth may be very readily moved from place to place.

In the housing part 3 at the back wall 18 there is a folding seat 22 articulated, which, before the housing parts 2 and 3 are pushed together, is folded up against the back wall 18.

At at least one end of the vending booth 1 there is a folding door 23, able to be turned through 180° (see FIG. 3), which in the operation condition of the vending booth is in front of the inlet opening of the booth (FIG. 1) and before shutting up the vending booth is folded against the side wall 9, as will be seen marked by the arrow in FIG. 3 on the right. A further such folding door is present at the end of the vending booth which is on the left in FIG. 3.

The vending booth 1 does not, at its ends, have any projecting parts, so that it may readily be joined up with further vending booths 1' (FIG. 6b) and 1" (FIG. 6c) of the same sort. For lining up the vending booths, the folding doors 23 are folded back against the side walls 9, something which may readily be seen from FIGS. 6b and 6c. For general use the vending booth to be seen in FIG. 6a will, for example, be 2 meters long, so that the line-up to be seen in FIG. 6c will, in all, be 6 meters long. The single vending booths may in the system of FIGS. 6b and 6c be connected by releasable coupling parts (not shown) in the area of the side walls 9 and the ends of the frame 12 above the side walls 9, so that the booth may be kept joined together overnight. It is then only necessary for the guideframes 17 to be pushed into their vending booth and for the separate roller shutters 16 to be shut and locked.

The vending booth 1 has a 220 to 380 V line connection for the electrical apparatus in it and may, for this reason, be coupled with any electrical outlet of the necessary sort. For this reason, it may readily be used in buildings for sporting purposes, in fairs, exhibitions and festivals and, furthermore, as a separate vending booth within department stores and outdoors. By installation of the necessary counter structures, it may be adapted to all purposes (for vending snacks, hot and cold drinks, producing and/or vending of icecream and of ready-packed goods etc.).

A further form of my mobile vending booth is to be seen in FIGS. 7 to 12.

This second form of the mobile vending booth has more space and for general use is made greater in size than the first form of my invention and is, more specially, designed for use outdoors.

The vending booth, generally numbered 101, is made up a single-piece housing (unlike the two-piece vending booth 1) and is generally constructed like a four-wheel camping trailer with a chassis 132, and end inlet door 133 and a roof ventilating unit 134. On the two long-sides the vending booth 101 has one vending opening 104 and within the booth on a chassis floor 107 counter structures 111 are present, in the case of which it may be a question of the same structures as used in the first form of my invention of which an account has been given. Behind the vending opening over the counter structures, glass cupboards 114 are placed.

Near the roof of the vending booth 101 U-rails 115 are fixed in position. The booth 101 has at the two long-sides guideframes 117 of U-rails 120, which are fixedly joined together by cross-beams 135. The guideframes 117 are, in the form of my invention to be seen in the figures, made with windows 105, which are fixedly joined with the guideframes. The U-rails 115 extend horizontally out from the roof part of the vending booth 101, are then bent downwards and go over the complete height of the vending booth in a vertical direction. At the roof, in the long-direction of the vending booth 101, two roller shutter boxes 136 are present, which each have a shaft on which the roller shutter 116 may be freely turned on rolling up, or it may have a shaft with a hand-driving system for rolling up the shutter 116.

On each long-side of the vending booth, an upwardly folding safe floor 137 is hinged. These floors may be folded upwards through 90°, so that they come into positions resting against the long-walls 108 of the vending booth.

If the vending booth in the shut-up condition, to be seen in FIG. 12, is to be got ready for use, the two guideframes 117 on the two long-sides are pulled down into position of FIG. 8 from the inside of the vending booth. When this is done, the windowed ends of the guideframes 117 are slipped out of their spaces 138, while the U-rails 120 of the guideframes are slipped out of the fixed-position U-rails 115, in which they are telescopingly guided. Before the pulling out of the guideframes 117 the roller shutters 116 are best pushed upwards, that is to say rolled up in the roller shutter boxes 136. After pulling out the guideframes 117, the floors 137 are folded downwards and, at the same time, feet 139 are folded downwards for supporting the floors 137 on the earth.

The roller shutters 116 are, in each case, separated in the middle into two parts, so that, in case of need, or when the weather is poor, only one half of the vending booth has to be opened, this being made clear in FIG. 9. At their ends, which are near together, the two roller shutters 116 are guided, at each long-side of the vending booth 101, in a double U-rail 140, which, at its lower end, is, as well, fixedly joined to the cross-rail 135 and at the top near the roof has its own telescoping guide, not shown.

Over each vending opening 104, there is in the roof of the vending booth 101 an upwardly folding door 143 having on it the name of a company or an advertisement. In the operation condition (see FIG. 8) it is turned upwards into an upright position, while overnight or in the transport condition of the vending booth, it is folded downwards.

The end walls, having windows 105, of the guideframe may have folding doors in place of the window material, so that even when the guideframes 117 are pulled out and the roller shutters 116 are let down (for example when the weather is poor or the temperature is very low), customers are able to get into the space in front of the vending openings 104.

The vending booth 101 has a trailer connection 144 at the end with the inlet door 133. The connection 144 has a step 141 placed on it, making it easier for persons working the booth to get into the inside of it.

The vending booth 101 is, as the reader will readily be able to see from FIGS. 7 and 8, made with full symmetry about an upright plane running in the long-direction (although the counter structures 111 may not have such symmetry). With this construction vending from the two long-sides of the booth is possible, one side being for example facing a street, while the other is facing a garden. In the form of my invention to be seen here, the counter structures 111 are made up of a hot counter 111a with a chicken infrared grill 111b and a cash desk 111c on the one long-side while on the other side I have a cold counter 111a' with a washing up unit 111d and a cash desk 111c'. The chassis floor 107 is tiled on the inner side.

The chassis 132 has conventionally four wheels with pneumatic tires. The vending booth 101 itself is generally of light alloy. The strips of the roller shutters are, as well, made of light alloy, this being true of the guideframes as well. The vending booth 101 is, like the first form of my invention, provided with a 220/380 V electricity connection cable so that it may be coupled with any electrical outlet of the right sort.

FIGS. 10 to 12 are views of different conditions of the vending booth 101. In FIG. 10 the two guideframes 117 are pulled out so that vending may take place, as desired, on one long-side or on the two long sides. In FIG. 9 on the left, the shut condition of the roller shutter 116 is to be seen with the open condition on the right hand side. Overnight the two roller shutters 116 are shut. In FIG. 11 the condition of the vending booth is to be seen when vending is only to take place from one side. The right guideframe is in this case not pulled out. The transport condition is to be seen in FIG. 12, in which the guideframes are not pulled out and all roller shutters are let down. The length of each roller shutter is such that the vending booth may be completely shut on its long-side, not only when the guideframe 117 is pulled out, but furthermore when it is not pulled out.

The embodiments of the invention in which an exclusive property or privilege is claimed are:

1. A mobile vending booth with a vending opening at at least one long-side and with a chassis floor, characterised by at least one roller shutter for shutting at least the vending opening and by at least one roller shutter guideframe, which is slidingly supported within the vending booth and is able to be pulled out for making the vending booth broader, as necessary for vending, along one full long-side of the vending booth.

2. A vending booth as claimed in claim 1, characterised in that the roller shutter is guided at the inner ends of the vending booth in fixedly placed U-rails, in which at the roof further U-rails of the guideframe may be telescopically moved.

3. A vending booth as claimed in claim 2, characterised in that the U-rails of the guideframe extend along the long-side, far from the vending opening, of the vending booth vertically in a downward direction from the roof part.

4. A vending booth as claimed in claim 3, characterised in that on the guideframe on the long-side, far from the vending opening, of the vending booth there is a back wall which is fixed in position stopping short of the full height of the roof and in that the length of the roller shutter is such that, when the guideframe is not pulled out, it shuts the vending opening and the back side of the vending booth, while, when the guideframe is pulled out, the vending opening is cleared by the roller shutter.

5. A vending booth as claimed in anyone of claims 1 to 4, characterised in that the guideframe has a fixed floor, which, when the guideframe is not pulled out, is under the chassis floor of the vending booth, and when the guideframe is pulled out, projects from the chassis floor and extends substantially in line therewith.

6. A vending booth as claimed in claim 5, characterised in that the chassis floor and the floor of the guideframe are each supported by way of ball rollers on the earth.

7. A vending booth as claimed in anyone of claims 1 to 4, characterised in that at at least one end of the vending booth there is a folding door able to be turned through 180°.

8. A vending booth as claimed in anyone of claims 1 to 4, characterised in that it may be made longer by the joining up at its end of further vending booths of similar construction.

9. A vending booth as claimed in claim 4, characterised in that at the inner side of the back wall a folding seat is hinged.

10. A vending booth as claimed in anyone of claims 1 to 4, characterised in that a counter system, is placed behind the vending opening, and has counter structures for the vending and/or preparing of cold and/or hot food and drinks.

11. A vending booth as claimed in anyone of claims 1 to 4, characterised by a rest running under the vending opening along the long-side and the two ends of the booth.

12. A vending booth as claimed in claim 11, characterised in that its ends have windows above the rest.

13. A vending booth as claimed in claim 1 or claim 2, characterised by at least one roller shutter box placed near the roof between the two fixedly positioned U-rails and extending over the breadth of the roller shutter, the roller shutter box having a shaft for rolling up the roller shutter.

14. A vending booth as claimed in claim 13, characterised in that at least two roller shutter boxes are placed one after the other in the long-direction so that two roller shutters may be separately operated in front of each vending opening.

15. A vending booth as claimed in claim 13, characterised in that down at each long-side having a vending opening there is a side floor articulated so that it may be folded upwards.

16. A vending booth as claimed in claim 13, characterised by a counter system, placed behind each vending opening, having counter structures for the vending and/or preparing of cold and/or hot food and drinks.

17. A vending booth as claimed in claim 13, characterised in that in the roof above each vending opening there is an upwardly folding door.

18. A vending booth as claimed in claim 13, characterised in that its chassis floor is placed on a camping trailer chassis.

19. A vending booth as claimed in claim 15, characterised in that the U-rails of the guideframe extend each to the level of the hinge shaft of the side floor and at this position the U-rails are fixedly joined together by crossbeams.

20. A vending booth as claimed in claim 15, characterised in that the side floor is able to be supported on the earth by means of folding feet.

21. A vending booth as claimed in claim 15, characterised in that the guideframe is paned at the two ends of the booth.

22. A vending booth as claimed in claim 13, characterised in that the length of each roller shutter is such that the vending booth at its long-side may be completely shut off both when the guideframe is pulled out and when it is not pulled out.

23. A vending booth as claimed in claim 13, characterised in that it is mirror-inverted symmetrical with respect to its vertical longitudinal center plane.

* * * * *